US011597863B2

(12) United States Patent
Sodhi

(10) Patent No.: US 11,597,863 B2
(45) Date of Patent: Mar. 7, 2023

(54) METHODS OF CEMENTING A WELLBORE

(71) Applicant: Thomas S. Sodhi, New Caney, TX (US)

(72) Inventor: Thomas S. Sodhi, New Caney, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/816,618

(22) Filed: Mar. 12, 2020

(65) Prior Publication Data
US 2020/0299563 A1 Sep. 24, 2020

Related U.S. Application Data

(60) Provisional application No. 62/821,466, filed on Mar. 21, 2019.

(51) Int. Cl.
C09K 8/467 (2006.01)
E21B 33/13 (2006.01)
C04B 28/02 (2006.01)
C04B 22/12 (2006.01)
C04B 24/12 (2006.01)
C04B 24/10 (2006.01)
C04B 103/40 (2006.01)

(52) U.S. Cl.
CPC ............ C09K 8/467 (2013.01); C04B 22/124 (2013.01); C04B 24/10 (2013.01); C04B 24/122 (2013.01); C04B 28/02 (2013.01); E21B 33/13 (2013.01); C04B 2103/408 (2013.01)

(58) Field of Classification Search
CPC .......... C09K 8/46; C09K 8/467; C09K 8/493; C09K 8/487; C09K 8/48; C09K 8/473; C04B 22/124; C04B 24/122; C04B 28/02; C04B 2103/408; E21B 33/13
See application file for complete search history.

(56) References Cited

U.S. PATENT DOCUMENTS

| 4,522,653 | A | * | 6/1985 | Rao | C09K 8/46 |
| | | | | | 166/293 |
| 5,447,197 | A | * | 9/1995 | Rae | C04B 28/08 |
| | | | | | 166/293 |
| 6,173,778 | B1 | * | 1/2001 | Rae | C04B 24/38 |
| | | | | | 106/730 |
| 6,209,646 | B1 | * | 4/2001 | Reddy | C04B 40/0633 |
| | | | | | 166/293 |
| 6,336,505 | B1 | * | 1/2002 | Reddy | C04B 28/04 |
| | | | | | 166/293 |
| 6,641,661 | B1 | | 11/2003 | Jardine et al. | |
| 6,832,652 | B1 | | 12/2004 | Dillenbeck et al. | |
| 7,021,380 | B2 | * | 4/2006 | Caveny | C04B 40/0039 |
| | | | | | 166/293 |
| 9,359,254 | B2 | * | 6/2016 | Vorderbruggen | C04B 28/02 |
| 9,371,712 | B2 | * | 6/2016 | Boul | C09K 8/428 |
| 10,125,303 | B2 | | 11/2018 | Wilson et al. | |
| 2005/0241538 | A1 | * | 11/2005 | Vargo | C09K 8/467 |
| | | | | | 106/713 |
| 2008/0066655 | A1 | * | 3/2008 | Fraser | C04B 28/04 |
| | | | | | 106/709 |
| 2013/0269940 | A1 | * | 10/2013 | Michaux | C04B 24/006 |
| | | | | | 166/292 |
| 2015/0299555 | A1 | | 10/2015 | Piot et al. | |
| 2017/0002257 | A1 | * | 1/2017 | Pisklak | C04B 28/34 |
| 2017/0167223 | A1 | * | 6/2017 | James | C09K 8/467 |

FOREIGN PATENT DOCUMENTS

CN 103059824 A 4/2013

OTHER PUBLICATIONS

International Search Report for International Application No. PCT/US2020/023179, International Filing Date Mar. 17, 2020, dated Jul. 8, 2020, 3 pages.
Written Opinion for International Application No. PCT/US2020/023179, International Filing Date Mar. 17, 2020, dated Jul. 8, 2020, 9 pages.

* cited by examiner

Primary Examiner — Angela M DiTrani Leff
(74) Attorney, Agent, or Firm — Cantor Colburn LLP

(57) ABSTRACT

A method of cementing a wellbore comprises combining a liquid additive with a cement slurry, the liquid additive comprising a metal gluconate, an alkali metal or an alkaline earth metal salt, an alkanolamine, a dispersant, and water to form a cementing composition; injecting the cementing composition into the wellbore; and allowing the cementing composition to set.

6 Claims, No Drawings

METHODS OF CEMENTING A WELLBORE

CROSS REFERENCE TO RELATED APPLICATIONS

This application claims the benefit of U.S. Provisional Application No. 62/821,466, filed Mar. 21, 2019, which is incorporated by reference in its entirety herein.

BACKGROUND

In the oil and gas industry, cementing is a technique employed during many phases of borehole operations. For example, a cement slurry may be employed to cement or secure various casing strings and/or liners in a well. In other cases, cementing may be used in remedial operations to repair casing and/or to achieve formation isolation. In still other cases, cementing may be employed to isolate selected zones in the borehole and to temporarily or permanently abandon a borehole. Because of the extensive use of cement in the oil and gas industry, the art would be receptive to alternative materials and methods for cementing wellbores.

SUMMARY

A method of cementing a wellbore comprises combining a liquid additive with a cement slurry, the liquid additive comprising a metal gluconate, an alkali metal or an alkaline earth metal salt, an alkanolamine, a dispersant, and water to form a cementing composition; injecting the cementing composition into the wellbore; and allowing the cementing composition to set.

A cement composition comprises: a cement component; about 0.5 to 10 gallons of a liquid additive per 100 sacks of the cement component, the liquid additive comprising: about 0.1 wt. % to about 10 wt. % of a metal gluconate; about 2 wt. % to about 20 wt. % of an alkali metal or alkaline earth metal salt; about 0.1 wt. % to about 10 wt. % of an alkanolamine; about 0.1 wt. % to about 10 wt. % of a dispersant, each based on the total weight of the liquid additive.

DETAILED DESCRIPTION

The inventor has found that the early strength of a cement can be greatly increased by adding liquid additives to a cement slurry. In particular, it has been found that the use of specific chemical additives alone do not constitute an increase of cement strength in 24 hours at room temperature, but when combined within specific ranges of amounts the same liquid additives can increase the overall compressive strength of a cement by about 30%. Further, the liquid additives as disclosed herein can increase the early strength of cements without surface gelation, as opposed to other accelerators that may gel the cements at the surface.

The liquid additives contain a metal gluconate component, an alkali or alkaline earth metal salt, an alkanolamine, a dispersant, and water. Metal gluconates include iron (II) gluconate, iron (II) gluconate hydrate, calcium gluconate, calcium gluconate hydrate, magnesium gluconate, magnesium gluconate hydrate, or a combination comprising at least one of the foregoing. Iron (II) gluconate hydrate is specifically mentioned. The metal gluconate can be present in an amount ranging from a lower level of at least about 0.1%, 0.5%, or 1%, to an upper level of equal to or less than about 10%, 8%, 6%, 4%, or 3%, wherein each of the percent is weight percent based on the total weight of the liquid additives.

An alkali or alkaline earth metal salt includes a lithium salt, a sodium salt, a potassium salt, a calcium salt, or a combination comprising at least one of the foregoing. The alkali or alkaline earth metal salts can be halides, nitrates, acetates, oxides, hydroxides, carbonates, bicarbonates, or a combination comprising at least one of the foregoing. Chlorides such as lithium chloride are specifically mentioned. The alkali metal or alkaline earth metal can be present in an amount ranging from a lower level of at least about 2%, 4%, 6%, or 8%, to an upper level of equal to or less than about 20%, 18%, 16%, 15%, or 12%, wherein each of the percent is weight percent based on the total weight of the liquid additive.

The dispersant includes polynaphthalene sulphonates, naphthalene sulfonate formaldehyde condensates, acetone formaldehyde sulfite condensates, glucan delta lactone derivatives, sulfonated styrene maleic anhydride copolymer, sulfonated vinyltoluene maleic anhydride copolymer, sulfonated acetone condensed with formaldehyde, allyloxybenzene sulfonate, lignosulfonates, melamine sulfonates, sulfonated melamine formaldehyde condensates, urea formaldehyde-based dispersants, polycarboxylate, polyaspartate, oligomeric dispersants, or a combination comprising at least one of the foregoing. As used herein the described dispersants include the corresponding salt forms. As an example, polynapthalene sulphonates are available as sodium and/or calcium salts.

The dispersant can be present in an amount ranging from a lower level of at least about 0.1%, 0.5%, 1%, 2%, or 3%, to an upper level of equal to or less than about 10%, 8%, 6%, or 5%, wherein each of the percent is weight percent based on the total weight of the liquid additive.

Examples of the alkanolamine include triethanolamine, triisopropanolamine, diethanolisopropanolamine, N,N,N', N'-tetra(2-ethoxy)ethylenediamine (THEED) and ethanoldiisopropanolamine. Triethanol amine is specifically mentioned. Combinations of the alkanolamines can be used. The alkanolamine can be present in an amount ranging from a lower level of at least about 0.1%, 0.5%, 1%, 2%, or 3%, to an upper level of equal to or less than about 10%, 8%, 6%, or 5%, wherein each percent is weight percent based on the total weight of the liquid additive.

The liquid additives contains about 70 to about 90 wt. % or about 75 to about 85 wt. % of water, based on the total weight of the liquid additives.

In a specific exemplary embodiment, the liquid additives contain about 0.1 to about 10 wt. % of iron (II) gluconate hydrate, about 2 to about 20 wt. % of lithium chloride, about 0.1 to about 10 wt. % of triethanol amine, about 0.1 to about 10 wt. % of a dispersant, and about 70 to 90 wt. % of water, each based on the total weight of the liquid additives. In another specific exemplary embodiment, the liquid additives contain about 0.5 to 5 wt. % or about 1 to 3 wt. % of iron (II) gluconate hydrate, about 5 to 15 wt. % or about 8 to 12 wt. % of lithium chloride, about 2 to 8 wt. % or about 3 to 5 wt. % of triethanol amine, about 1 to 5 wt. % or about 2 to 4 wt. % of a dispersant, and about 75 to 85 wt. % of water, each based on the total weight of the liquid additives.

The liquid additive as disclosed herein can be combined with a cement slurry to improve the early compressive strength of the cement slurry. About 0.5 to about 10 gallons or about 1 to 5 gallons of the liquid additives can be combined with a sack of the cement slurry.

The cement slurry comprises an aqueous carrier, a cement component, and a cement additive comprising a gelling agent, a fluid loss control agent, an extender, a defoamer, a weighting agent, a thixotropic agent, a bridging agent or lost circulation material, a silicate material, a clay stabilizer, or a combination comprising at least one of the foregoing.

The aqueous carrier is present in the cement slurries in an amount of about 10% to about 60% by weight, more preferably in an amount of about 20% to about 40% by weight, based on the total weight of the cement slurry. The aqueous carrier fluid can be fresh water, brine (including seawater), an aqueous base, or a combination comprising at least one of the foregoing.

The cement component of the cement slurry can be any cementitious material that sets and hardens by reaction with water, and is suitable for forming a set cement downhole, including mortars and concretes. Suitable cement components include those typically employed in a wellbore environment, for example those comprising calcium, aluminum, silicon, oxygen, and/or sulfur. Such cements include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V. The cements herein also can include various concretes by the further addition of aggregates, such as a coarse aggregate made of gravel or crushed rocks such as chert, quartzite, granite, and/or a fine aggregate such as sand or crushed sand. Aggregate can be added in an amount of about 10% to about 70% by weight of the hydraulic cement, and more particularly about 20% to about 40% by weight.

The cement component can be present in the slurry in an amount of about 50 to about 95 wt. %, preferably about 60 to about 90 wt. %, more preferably about 65 to about 85 wt. %, based on the total weight of the cement slurry.

The cement slurries can further comprise other components known for use in cementing, for example a fluid loss control agent, an extender to lower density, a gelling agent to increase viscosity, a defoamer to reduce foaming, a weighting agent to increase density, other fluid loss control agents, thixotropic agents, a bridging agent or lost circulation material (e.g., gilsonite or cellophane flakes), silicate materials such as sand, silica flour, fumed silica, act to strengthen cement as well as protect from strength retrogression effects at temperatures above 230° F., clay stabilizers, or a combination comprising at least one of the foregoing. These additive components are selected to avoid imparting unfavorable characteristics to the cement slurries, and to avoid damaging the wellbore or subterranean formation. Each additive can be present in amounts generally known to those of skill in the art.

Gelling agents include welan, xanthan, diutan, dextran gum, starch, starch derivatives, polysaccharides, cellulose, cellulosic derivatives, hydroxyalkyl cellulose, carboxyalkyl celluloses, carboxyalkyl hydroxyalkyl celluloses, dialkyl carboxyalkyl celluloses, or a combination comprising at least one of the foregoing.

Extenders include low density aggregates, clays such as hydrous aluminum silicates (e.g., bentonite (85% mineral clay smectite), pozzolan (finely ground pumice of fly ash), diatomaceous earth, silica, e.g., a quartz and condensed silica fumed silica, expanded Pearlite, gilsonite, powdered coal, and the like.

Defoamers include polysiloxanes, paraffinic oils, mineral oils, vegetable oils as well as the mixtures.

Weighting agents are high-specific gravity and finely divided solid materials used to increase density. The rare earth-containing compound can be the only weighting agents present in a cement slurry. Alternatively, the rare earth-containing compounds can be used together with other weighting agents such as silica flour, fly ash, calcium carbonate, barite, hematite, ilmenite, siderite, and the like.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$, and KCl, which also act at low concentrations to generally accelerate the set time associated with a cement slurry.

The solid content of the cement slurry is about 50 to about 95 wt. % based on the total slurry weight, preferably about 60 to about 90 wt. % based on the total slurry weight, more preferably about 65 to about 85 wt. %, based on the total slurry weight.

The cement slurry can have a viscosity lower than 600 mPa-s at a shear rate of 100 $s^{-1}$. The cement slurry is a low-density cement slurry or a high-density cement slurry. The density of a scavenger or low-density cement slurry can vary with such densities between about 9 up to about 15 pounds per gallon, or about 10 to about 14 pounds per gallons, or about 11 up to about 13 pounds per gallon. The high density cement slurries can have a density of about 15 to about 25 pounds per gallon. In an embodiment, the cement slurry has a density of about 10 to about 20 pounds per gallon or about 12 to about 18 pounds per gallon.

The liquid additives can be combined with the cement slurry "on the fly" via an additive injection nozzle or a chemical injection pump to form a cement blend. In other words, the liquid additives are added to the cement slurry while the slurry is pumped downhole. Alternatively, the cement slurry is pre-mixed with the liquid additives on site in a vessel such as a mixer, blender, and the like to provide a cement blend, and then the blend is immediately injected into the wellbore. The cement slurry and the liquid additives can then be injected, e.g., pumped and placed by various conventional cement pumps and tools to any desired location within the wellbore to fill any desired shape form. In an embodiment, injecting the cement slurry and liquid additives comprises pumping the slurry and liquid additives via a tubular in the wellbore. For example, the slurry and liquid additives can be pumped into an annulus between a tubular and a wall of the wellbore via the tubular.

The method is particularly useful for cementing a wellbore, which includes injecting, generally pumping, into the wellbore the slurry and the liquid additives at a pressure sufficient to displace a drilling fluid, for example a drilling mud, a cement spacer, or the like, optionally with a "lead slurry" or a "tail slurry". The slurry and the liquid additives can be introduced between a penetrable/rupturable bottom plug and a solid top plug. Once placed, the cement slurry is allowed to harden.

The cement slurry and the liquid additives can be used to form downhole components, including various casings, seals, plugs, packings, liners, and the like. In an embodiment the component is a plug, including a temporary plug, permanent plug, or a whipstock plug. The whipstock plug can be used to kick off from a vertical wellbore when a directional change in drilling is desired. The cement slurry and liquid additives can be used in vertical, horizontal, or deviated wellbores.

The beneficial effects of using liquid additives in cement slurries are further illustrated in the following examples.

Examples

A neat cement, viscosifier, defoamer, and water were combined to form a control cement having a density of 16.4 ppg. The control sample was cured in a water bath at 80° F. and ambient pressure for 24 hours. The cured control sample had a compressive strength of 2,348 psi.

A liquid additive containing 2 wt. % ferrous (II) gluconate hydrate, 10 wt. % lithium chloride, 4 wt. % % triethanolamine, 3 wt. % dispersant, and 81 wt. % water, each based on the total weight of the liquid additive, was added to the control cement in an amount of 0.3 gallons per sack (gps) of the cement slurry. The obtained cement composition was cured at 80° C. and ambient pressure for 24 hours. The cured cement had a compressive strength of 3,128 psi, which represents an increase of 33% over the control sample.

Further included in this disclosure are the following specific embodiments, which do not necessarily limit the claims.

Embodiment 1. A method of cementing a wellbore, the method comprising: combining a liquid additive with a cement slurry, the liquid additive comprising a metal gluconate, an alkali metal or an alkaline earth metal salt, an alkanolamine, a dispersant, and water to form a cementing composition; injecting the cementing composition into the wellbore; and allowing the cementing composition to set.

Embodiment 2. The method as in any prior embodiment, wherein the metal gluconate comprises iron (II) gluconate, iron (II) gluconate hydrate, calcium gluconate, calcium gluconate hydrate, magnesium gluconate, magnesium gluconate hydrate, or a combination comprising at least one of the foregoing.

Embodiment 3. The method as in any prior embodiment, wherein the metal gluconate comprises iron (II) gluconate hydrate.

Embodiment 4. The method as in any prior embodiment, wherein the metal gluconate is present in an amount of about 0.1 wt. % to about 10 wt. %, based on the total weight of the liquid additive.

Embodiment 5. The method as in any prior embodiment, wherein the alkali metal or alkaline earth metal salt comprises a lithium salt, a sodium salt, a potassium salt, a calcium salt, or a combination comprising at least one of the foregoing.

Embodiment 6. The method as in any prior embodiment, wherein the alkali metal or alkaline earth metal salt is present in an amount of about 2 wt. % to about 20 wt. % based on the total weight of the liquid additive.

Embodiment 7. The method as in any prior embodiment, wherein the alkanolamine comprises triethanolamine, triisopropanolamine, diethanolisopropanolamine, N,N,N',N'-tetra(2-ethoxy)ethylenediamine, ethanoldiisopropanolamine, or a combination comprising at least one of the foregoing.

Embodiment 8. The method as in any prior embodiment, wherein the alkanolamine comprises triethanolamine.

Embodiment 9. The method as in any prior embodiment, wherein the alkanolamine is present in an amount of about 0.1 wt. % to about 10 wt. % based on the total weight of the liquid additive.

Embodiment 10. The method as in any prior embodiment, wherein the dispersant comprises polynaphthalene sulphonates, naphthalene sulfonate formaldehyde condensates, acetone formaldehyde sulfite condensates, glucan delta lactone derivatives, sulfonated styrene maleic anhydride copolymer, sulfonated vinyltoluene maleic anhydride copolymer, sulfonated acetone condensed with formaldehyde, allyloxybenzene sulfonate, lignosulfonates, melamine sulfonates, sulfonated melamine formaldehyde condensates, urea formaldehyde-based dispersants, polycarboxylate, polyaspartate, oligomeric dispersants, or a combination comprising at least one of the foregoing.

Embodiment 11. The method as in any prior embodiment, wherein the dispersant is present in an amount of about 0.1 wt. % to about 10 wt. % based on the total weight of the liquid additive.

Embodiment 12. The method as in any prior embodiment, wherein about 0.5 to about 10 gallons of the liquid additive is combined with the cement slurry per sack of the cement slurry.

Embodiment 13. The method as in any prior embodiment, wherein the cement slurry comprises an aqueous carrier, a cement component, and an additive comprising a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

Embodiment 14. The method as in any prior embodiment, wherein the cement slurry has a density of about 10 to about 20 pounds per gallon.

Embodiment 15. The method as in any prior embodiment, wherein the liquid additive is added to the cement slurry via an additive injection nozzle or a chemical injection pump while the cement slurry is injected into the wellbore.

Embodiment 16. The method as in any prior embodiment, further comprising adjusting amounts of the cement slurry, the liquid additive, or a combination thereof in situ while the cement slurry and the liquid additive are injected into the wellbore.

Embodiment 17. A cement composition comprising: a cement component; about 0.5 to 10 gallons of a liquid additive per 100 sacks of the cement component, the liquid additive comprising: about 0.1 wt. % to about 10 wt. % of a metal gluconate; about 2 wt. % to about 20 wt. % of an alkali metal or alkaline earth metal salt; about 0.1 wt. % to about 10 wt. % of an alkanolamine; about 0.1 wt. % to about 10 wt. % of a dispersant, each based on the total weight of the liquid additive.

Embodiment 18. The cement composition as in any prior embodiment, wherein the metal gluconate comprises iron (II) gluconate, iron (II) gluconate hydrate, calcium gluconate, calcium gluconate hydrate, magnesium gluconate, magnesium gluconate hydrate, or a combination comprising at least one of the foregoing; the alkali metal or alkaline earth metal salt comprises a lithium salt, a sodium salt, a potassium salt, a calcium salt, or a combination comprising at least one of the foregoing; the alkanolamine comprises triethanolamine, triisopropanolamine, diethanolisopropanolamine, N,N,N',N'-tetra(2-ethoxy)ethylenediamine, ethanoldiisopropanolamine, or a combination comprising at least one of the foregoing.

Embodiment 19. The cement composition as in any prior embodiment, wherein the dispersant comprises polynaphthalene sulphonates, naphthalene sulfonate formaldehyde condensates, acetone formaldehyde sulfite condensates, glucan delta lactone derivatives, sulfonated styrene maleic anhydride copolymer, sulfonated vinyltoluene maleic anhydride copolymer, sulfonated acetone condensed with formaldehyde, allyloxybenzene sulfonate, lignosulfonates, melamine sulfonates, sulfonated melamine formaldehyde condensates, urea formaldehyde-based dispersants, polycarboxylate, polyaspartate, oligomeric dispersants, or a combination comprising at least one of the foregoing.

Embodiment 20. The cement composition as in any prior embodiment, further comprising a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:

1. A method of cementing a wellbore, the method comprising:
   combining a liquid additive with a cement slurry, the liquid additive comprising, based on a total weight of the liquid additive, 1 to 3 wt. % of iron (II) gluconate hydrate, 8 to 12 wt. % of lithium chloride, 3 to 5 wt. % of triethanolamine, 2 to 4 wt. % of a dispersant, and 75 to 85 wt. % of water to form a cementing composition; injecting the cementing composition into the wellbore; and
   allowing the cementing composition to set forming a cement, wherein an overall compressive strength of the cement is increased by 30% as compared to that of a reference cement formed from the same cement slurry without the liquid additive.

2. The method of claim 1, wherein the dispersant comprises one or more of polynaphthalene sulphonates, naphthalene sulfonate formaldehyde condensates, acetone formaldehyde sulfite condensates, glucan delta lactone derivatives, sulfonated styrene maleic anhydride copolymer, sulfonated vinyltoluene maleic anhydride copolymer, sulfonated acetone condensed with formaldehyde, allyloxybenzene sulfonate, lignosulfonates, melamine sulfonates, sulfonated melamine formaldehyde condensates, urea formaldehyde-based dispersants, polycarboxylate, polyaspartate, or oligomeric dispersants.

3. The method of claim 1, wherein the cement slurry comprises one or more of an aqueous carrier, a cement component, and an additive comprising a gelling agent, a fluid loss control agent, an extender, a defoamer, a weighting agent, a dispersant, a thixotropic agent, a bridging agent or lost circulation material, a silicate material, or a clay stabilizer.

4. The method of claim 1, wherein the cement slurry has a density of about 10 to about 20 pounds per gallon.

5. The method of claim 1, wherein the liquid additive is added to the cement slurry via an additive injection nozzle or a chemical injection pump while the cement slurry is injected into the wellbore.

6. The method of claim 5, further comprising adjusting amounts of the cement slurry, the liquid additive, or a combination thereof in situ while the cement slurry and the liquid additive are injected into the wellbore.

* * * * *